(No Model.)
J. E. LEWIS.
AXLE NUT FOR VEHICLES.
No. 569,215. Patented Oct. 13, 1896.
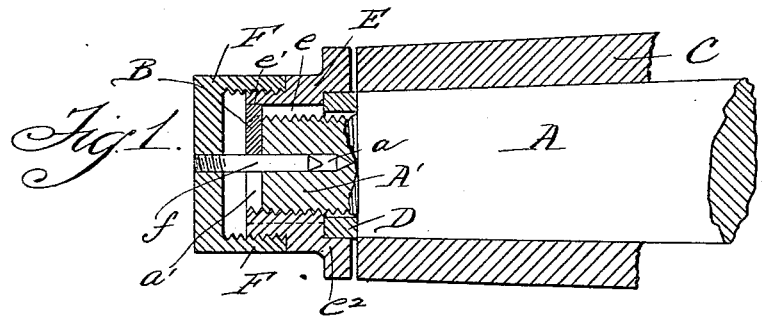
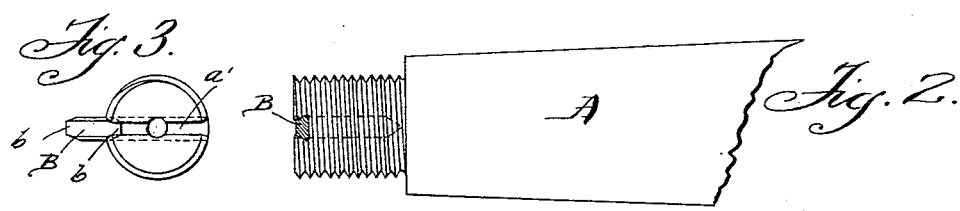
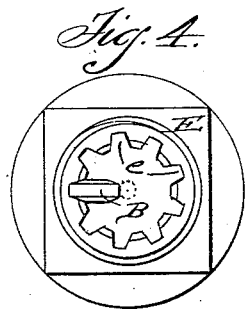
Witnesses.
David Levan
Caleb J. Buber
John E. Lewis
Inventor.
by
Attorney.

UNITED STATES PATENT OFFICE.

JOHN E. LEWIS, OF READING, PENNSYLVANIA.

AXLE-NUT FOR VEHICLES.

SPECIFICATION forming part of Letters Patent No. 569,215, dated October 13, 1896.

Application filed April 9, 1896. Serial No. 586,822. (No model.)

*To all whom it may concern:*

Be it known that I, JOHN E. LEWIS, a citizen of the United States, residing at Reading, county of Berks, State of Pennsylvania, have invented certain Improvements in Axles and Nuts for Vehicles, of which the following is a specification.

My invention relates particularly to vehicle-axles; and it consists in certain improvements in the construction of the spindle ends and of the nuts thereon, whereby said nuts are positively retained upon the spindle, while at the same time endwise adjustment of the nut to the greatest nicety is permitted, and the appearance of an ordinary nut is retained.

The invention is fully described in connection with the accompanying drawings and is specifically pointed out in the claim.

Figure 1 is a partially sectional view of the end of a vehicle-axle having my improved nut applied thereto. Fig. 2 is a separate view of the end of the axle, taken at right angles to that shown in Fig. 1. Fig. 3 is a separate view of the sliding catch. Fig. 4 is a plan view of the main portion of the nut.

A represents the spindle of an axle having a threaded end A', as usual. This end is in my construction provided with a transverse groove $a'$, preferably undercut or "dovetailed" to receive and retain a sliding catch B, the length of which is about one-half the length of the groove. A small central hole $a$ also extends inward from the extreme end of the axle. The nut is made in two parts, a main portion E and a cap F, which screws upon the exteriorly-threaded end $e'$ of the main nut and seats against the base $e^2$ of the same, so as to present the appearance of an ordinary nut when both parts are in position upon the axle. The main nut E is provided with a series of grooves or recesses $e$, arranged, preferably, as indicated in Fig. 4, with a recess diametrically opposite an unrecessed portion of the threaded interior of the nut. These recesses are adapted to receive either end $b\ b$ of the sliding catch B when the latter is moved outward on either side of the center of the spindle to engage the nut after the latter has been properly set up. The cap F, which is put in place after the main nut has been properly adjusted, is provided with a projecting pin $f$, which enters the central hole $a$ in the spindle after the catch has been moved out into engagement with one of the recesses $e$ in the nut and effectually prevents its disengagement.

In Fig. 1 the hub-box C is represented in position upon the spindle and the nut drawn up against the washer D, so as to take up endwise movement. With my construction this can be done with great exactness, owing to the fact that rotation of the nut E upon the spindle to the extent only of one-half the distance between the grooves $e$ permits the catch B to engage one of the latter on the opposite side of the center. The undercut of the groove prevents the catch from getting out of the groove except by a transverse movement, and when the cap has been screwed on the projecting pin $f$ positively locks the catch B in engagement with the nut E and so prevents any movement of the nut upon the spindle until the cap is first removed.

By my improved construction I not only provide for the positive retention of the nut upon the spindle, but am enabled to adjust the nut thereon with ease and practical exactness as the washer wears and at the same time retain the appearance of the usual construction.

What I claim is—

The combination with a spindle having a transverse groove $a'$ and central perforation in the end thereof, of a nut having a series of recesses $e$, a sliding catch B in said groove adapted to engage one of said recesses at either end of the groove, and a nut-cap having a projection entering said central perforation to prevent disengagement of the catch, substantially as set forth.

In testimony whereof I affix my signature in presence of two witnesses.

JOHN E. LEWIS.

Witnesses:
W. G. STEWART,
ADAM L. OTTERBEIN.